(12) United States Patent
Tchankotadze et al.

(10) Patent No.: US 12,073,202 B2
(45) Date of Patent: Aug. 27, 2024

(54) INTELLIGENT DATA PROCESSING SYSTEM WITH MULTI-INTERFACE FRONTEND AND BACKEND

(71) Applicant: C3.ai, Inc., Redwood City, CA (US)

(72) Inventors: David Tchankotadze, Saratoga, CA (US); Rohit P. Sureka, San Carlos, CA (US); Andrew J. Fitch, Redwood City, CA (US); Cherif Jazra, Palo Alto, CA (US); Dylan P. Huang, Palo Alto, CA (US); Edward L. Chayes, Palo Alto, CA (US); Manas Talukdar, Fremont, CA (US); Shivasankaran Somasundaram, San Mateo, CA (US)

(73) Assignee: C3.ai, Inc., Redwood City, CA (US)

( * ) Notice: Subject to any disclaimer, the term of this patent is extended or adjusted under 35 U.S.C. 154(b) by 74 days.

(21) Appl. No.: 17/698,934

(22) Filed: Mar. 18, 2022

(65) Prior Publication Data

US 2023/0297353 A1 Sep. 21, 2023

(51) Int. Cl.
*G06F 8/41* (2018.01)
*G06F 8/36* (2018.01)
*G06F 8/38* (2018.01)
*G06F 16/901* (2019.01)

(52) U.S. Cl.
CPC ............ *G06F 8/47* (2013.01); *G06F 8/36* (2013.01); *G06F 8/38* (2013.01); *G06F 16/9024* (2019.01)

(58) Field of Classification Search
CPC .......... G06F 8/38; G06F 8/36; G06F 16/9024; G06F 8/47
See application file for complete search history.

(56) References Cited

U.S. PATENT DOCUMENTS

| | | | |
|---|---|---|---|
| 6,968,329 B1 * | 11/2005 | Chung | H04L 67/565 706/45 |
| 10,545,978 B1 * | 1/2020 | Marschner | G06F 16/252 |
| 11,082,487 B1 | 8/2021 | Jain et al. | |
| 2007/0250839 A1 * | 10/2007 | Van Der Sanden | G06F 9/546 719/315 |
| 2017/0090893 A1 * | 3/2017 | Aditya | G06F 8/51 |
| 2017/0091673 A1 * | 3/2017 | Gupta | G06N 5/022 |
| 2020/0104530 A1 | 4/2020 | Park et al. | |
| 2020/0241920 A1 * | 7/2020 | Liverance | G06F 16/951 |

OTHER PUBLICATIONS

International Search Report and Written Opinion of the International Searching Authority dated Jul. 7, 2023 in connection with International Patent Application No. PCT/US2023/063505, 11 pages.

* cited by examiner

*Primary Examiner* — Phillip H Nguyen (57) ABSTRACT

A method includes identifying a sequence of transformations to be performed on an input dataset via a user interface. The method also includes identifying a first context associated with the input dataset. The method further includes selecting a first one of multiple execution engines to be used to perform the sequence of transformations on the input dataset based on the first context. In addition, the method includes providing first code implementing the sequence of transformations to the first execution engine and executing the first code using the first execution engine to perform the sequence of transformations on the input dataset.

21 Claims, 5 Drawing Sheets

INTELLIGENT DATA PROCESSING SYSTEM WITH MULTI-INTERFACE FRONTEND AND BACKEND

TECHNICAL FIELD

This disclosure is generally directed to data processing systems. More specifically, this disclosure is directed to an intelligent data processing system with a multi-interface frontend and backend.

BACKGROUND

Various data processing systems, such as those used to implement machine learning or artificial intelligence (ML/AI) algorithms or other data processing algorithms, can support a wide variety of technologies and tools used to obtain and process data. The design of a specific data processing system is often based on a set of assumptions that are initially made regarding characteristics such as the size or amount of data to be processed by the data processing system, the type(s) of data to be processed by the data processing system, and the needed or desired performance of the data processing system. These assumptions often weigh heavily on design decisions made for the data processing system at both the interface (frontend) level and the implementation (backend) level. Design decisions at the interface or frontend level typically include determining the design of a user interface or other interface to be used to interact with users or applications accessing the data processing system. Design decisions at the implementation or backend level typically include compiling code to be executed in order to perform desired data processing operations.

SUMMARY

This disclosure relates to an intelligent data processing system with a multi-interface frontend and backend.

In a first embodiment, a method includes identifying a sequence of transformations to be performed on an input dataset via a user interface. The method also includes identifying a first context associated with the input dataset. The method further includes selecting a first one of multiple execution engines to be used to perform the sequence of transformations on the input dataset based on the first context. In addition, the method includes providing first code implementing the sequence of transformations to the first execution engine and executing the first code using the first execution engine to perform the sequence of transformations on the input dataset.

In a second embodiment, an apparatus includes at least one processing device configured to identify a sequence of transformations to be performed on an input dataset via a user interface. The at least one processing device is also configured to identify a first context associated with the input dataset. The at least one processing device is further configured to select a first one of multiple execution engines to be used to perform the sequence of transformations on the input dataset based on the first context. In addition, the at least one processing device is configured to execute first code implementing the sequence of transformations using the first execution engine in order to perform the sequence of transformations on the input dataset.

In a third embodiment, a non-transitory computer readable medium stores computer readable program code that when executed causes one or more processors to identify a sequence of transformations to be performed on an input dataset via a user interface. The medium also stores computer readable program code that when executed causes the one or more processors to identify a first context associated with the input dataset. The medium further stores computer readable program code that when executed causes the one or more processors to select a first one of multiple execution engines to be used to perform the sequence of transformations on the input dataset based on the first context. In addition, the medium stores computer readable program code that when executed causes the one or more processors to execute first code implementing the sequence of transformations using the first execution engine in order to perform the sequence of transformations on the input dataset.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 5, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

As noted above, various data processing systems, such as those used to implement machine learning or artificial intelligence (ML/AI) algorithms or other data processing algorithms, can support a wide variety of technologies and tools used to obtain and process data. The design of a specific data processing system is often based on a set of assumptions that are initially made regarding characteristics such as the size or amount of data to be processed by the data processing system, the type(s) of data to be processed by the data processing system, and the needed or desired performance of the data processing system. These assumptions often weigh heavily on design decisions made for the data processing system at both the interface (frontend) level and the implementation (backend) level. Design decisions at the interface or frontend level typically include determining the design of a user interface or other interface to be used to interact with users or applications accessing the data processing system. Design decisions at the implementation or backend level typically include compiling code to be executed in order to perform desired data processing operations.

Unfortunately, the initial set of assumptions for a data processing system's design often leads to the creation of a data processing system that is suboptimal, particularly for use cases outside of the initial set of assumptions. Moreover, there is often a conflict between what should and should not be common across different data processing system designs. For instance, commonality across frontend designs may be desirable since that can help users to become more familiar with interfaces across different data processing system designs, which can increase the data processing systems' ease of use. In contrast, commonality across backend designs may not be desirable since optimizations of the implementations for different data processing system designs are typically dependent on the specific use cases for the data processing systems. Attempting to leverage the same data processing system design across different use cases can suffer from various shortcomings that typically outweigh any benefits. For example, an interface useful for streaming data may not be the best interface for use with batch-processed data (and vice versa). As another example, a data exploration tool useful for processing small amounts of data at any given time may become less useful or even non-functional when attempting to process large amounts of data. Even if multiple implementations are provided for use, users themselves often need to select which implementation will be used at a given time for specific data.

This disclosure provides an intelligent data processing system with a multi-interface frontend and backend. As described in more detail below, a data processing system can support at least one frontend (interface), which can be used by one or more users to identify data and transformations (code) to be applied to the data. Depending on the implementation, the data processing system may support the use of a single frontend or multiple frontends. The data processing system can capture the transformations and store information identifying the transformations, such as in a database. The data processing system can also use the information and a context associated with the data to perform the data processing operations. For example, the data processing system can select a specific execution engine from among multiple execution engines (which represent multiple backends) depending on the context, and code implementing the transformations to be performed can be generated or otherwise obtained for that specific execution engine. The specific execution engine can execute the code in order to perform the data processing operations on the data. The specific context can vary based on a number of factors, examples of which are provided below. The specific execution engine that is selected for use can also vary, such as when different users or applications are associated with different contexts or when the context associated with the same user or application changes over time. Different code for performing the data transformations can be generated or otherwise obtained based on the stored information, and the different code can be executed by different execution engines. This allows the same sequence of transformations to subsequently be requested one or multiple times and performed using one or more execution engines.

In this way, the data processing system is able to dynamically choose the execution engine (backend) that best fits the context in which at least one user or application is attempting to execute data transformations (code). The execution engines selected for different users or applications can vary based on their different contexts, and the execution engine selected for a single user or application may vary over time based on changing contexts. As a result, at least one user may manually write or otherwise provide code defining the data transformations once, and the data transformations can be performed using different execution engines without requiring the user(s) to rewrite the code for each execution engine. Essentially, the data processing system can decouple the choice of interface (frontend) from the choice of implementation (backend), thereby allowing the appropriate backend to be selected and used regardless of which frontend might be used. Overall, this allows the data processing system to switch between different execution engines depending on the nature of the data processing tasks that are being performed. This can be extremely useful in a number of scenarios, including those where use cases change over time or applications evolve over time. The data processing system can thereby provide a reliable data processing tool that is interactive, replicable, redundant, and secure. Various examples of specific benefits or advantages that might be obtained using a data processing system designed in accordance with this disclosure are provided below.

Figure 1:
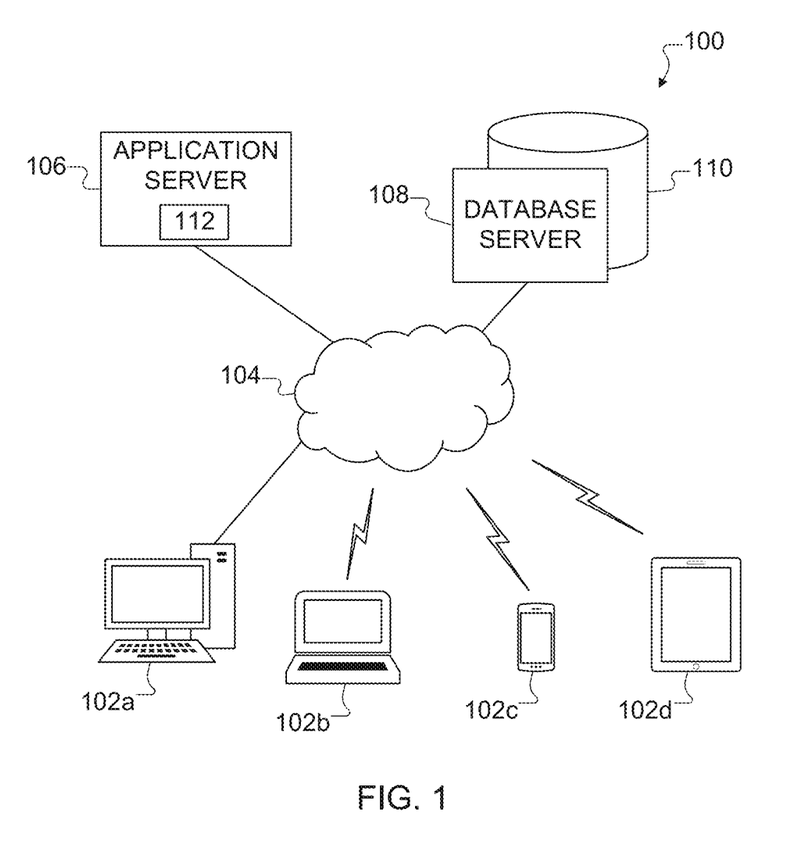
FIG. 1 illustrates an example system supporting intelligent data processing with a multi-interface frontend and backend according to this disclosure.

FIG. 1 illustrates an example system 100 supporting intelligent data processing with a multi-interface frontend and backend according to this disclosure. For example, the system 100 shown here can be used to support a data processing system having a functional architecture that provides one or more interfaces on the frontend and execution engine selection on the backend, which are described in more detail below. As shown in FIG. 1, the system 100 includes user devices 102a-102d, one or more networks 104, one or more application servers 106, and one or more database servers 108 associated with one or more databases 110. Each user device 102a-102d communicates over the network 104, such as via a wired or wireless connection. Each user device 102a-102d represents any suitable device or system used by at least one user to provide or receive information, such as a desktop computer, a laptop computer, a smartphone, and a tablet computer. However, any other or additional types of user devices may be used in the system 100.

The network 104 facilitates communication between various components of the system 100. For example, the network 104 may communicate Internet Protocol (IP) packets, frame relay frames, Asynchronous Transfer Mode (ATM) cells, or other suitable information between network addresses. The network 104 may include one or more local area networks (LANs), metropolitan area networks (MANs), wide area networks (WANs), all or a portion of a global network such as the Internet, or any other communication system or systems at one or more locations. In some cases, the network 104 may include at least one network within a company or other organization that performs data processing operations.

The application server 106 is coupled to the network 104 and is coupled to or otherwise communicates with the database server 108. The application server 106 supports a data processing functional architecture that provides one or more interfaces on the frontend and execution engine selection on the backend as described in more detail below. For example, the application server 106 may execute one or more applications 112, which can allow users to identify data and transformations to be applied to the data via at least one interface. Information associated with the identified data and the identified transformations can be sent from the application server 106 to the database server 108 for storage in the database 110. The one or more applications 112 can also allow users or applications to initiate data processing operations, which can cause the application server 106 to retrieve the information from the database 110 via the database server 108. The one or more applications 112 can use the retrieved information to generate or otherwise obtain code for execution by one or more selected execution engines. Each execution engine selected for a specific user or application can be determined based on the specific context associated with that user or application. Note that the database server 108 may also be used within the application server 106 to store information, in which case the application server 106 itself may store the information used to support data processing operations.

The database server 108 operates to store and facilitate retrieval of various information used, generated, or collected by the application server 106 and the user devices 102a-102d in the database 110. For example, the database server 108 may store various information related to data transformations to be applied to data as defined by one or more users. The database server 108 may also store information related to various execution engines, such as information identifying how specific execution engines are selected based on different characteristics of the contexts for various users or applications.

Although FIG. 1 illustrates one example of a system 100 supporting intelligent data processing with a multi-interface frontend and backend, various changes may be made to FIG. 1. For example, the system 100 may include any number of user devices 102a-102d, networks 104, application servers 106, database servers 108, and databases 110. Also, these components may be located in any suitable locations and might be distributed over a large area. In addition, while FIG. 1 illustrates one example operational environment in which intelligent data processing with a multi-interface frontend and backend may be used, this functionality may be used in any other suitable system.

Figure 2:
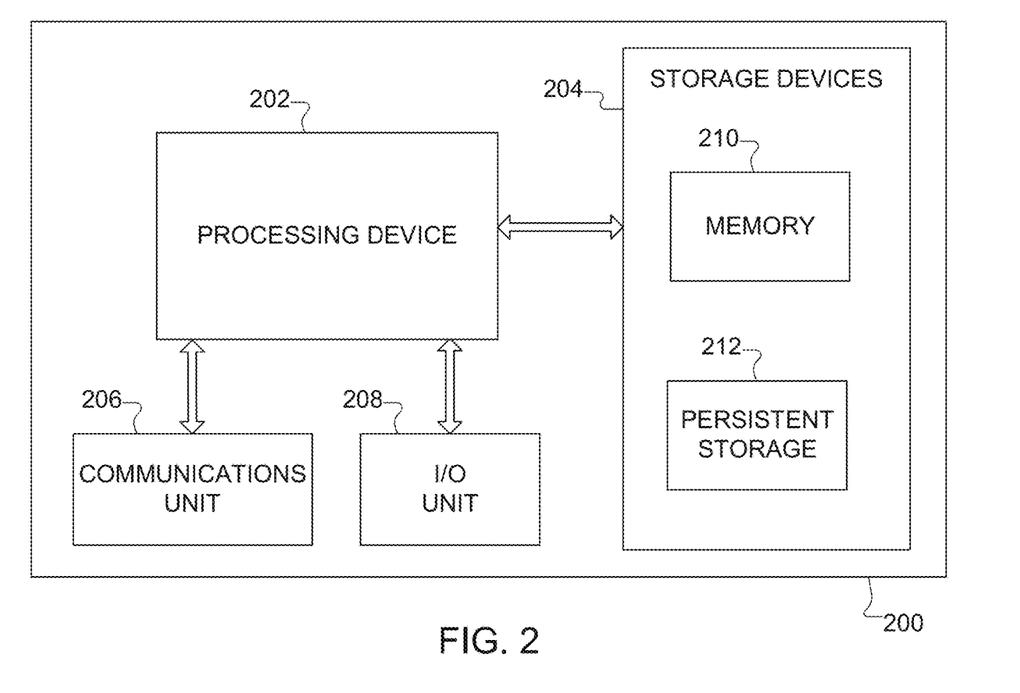
FIG. 2 illustrates an example device supporting intelligent data processing with a multi-interface frontend and backend according to this disclosure.

FIG. 2 illustrates an example device 200 supporting intelligent data processing with a multi-interface frontend and backend according to this disclosure. One or more instances of the device 200 may, for example, be used to at least partially implement the functionality of the application server 106 of FIG. 1. However, the functionality of the application server 106 may be implemented in any other suitable manner. In some embodiments, the device 200 shown in FIG. 2 may form at least part of a user device 102a-102d, application server 106, or database server 108 in FIG. 1. However, each of these components may be implemented in any other suitable manner.

As shown in FIG. 2, the device 200 denotes a computing device or system that includes at least one processing device 202, at least one storage device 204, at least one communications unit 206, and at least one input/output (I/O) unit 208. The processing device 202 may execute instructions that can be loaded into a memory 210. The processing device 202 includes any suitable number(s) and type(s) of processors or other processing devices in any suitable arrangement. Example types of processing devices 202 include one or more microprocessors, microcontrollers, digital signal processors (DSPs), application specific integrated circuits (ASICs), field programmable gate arrays (FPGAs), or discrete circuitry.

The memory 210 and a persistent storage 212 are examples of storage devices 204, which represent any structure(s) capable of storing and facilitating retrieval of information (such as data, program code, and/or other suitable information on a temporary or permanent basis). The memory 210 may represent a random access memory or any other suitable volatile or non-volatile storage device(s). The persistent storage 212 may contain one or more components or devices supporting longer-term storage of data, such as a read only memory, hard drive, Flash memory, or optical disc.

The communications unit 206 supports communications with other systems or devices. For example, the communications unit 206 can include a network interface card or a wireless transceiver facilitating communications over a wired or wireless network, such as the network 104. The communications unit 206 may support communications through any suitable physical or wireless communication link(s).

The I/O unit 208 allows for input and output of data. For example, the I/O unit 208 may provide a connection for user input through a keyboard, mouse, keypad, touchscreen, or other suitable input device. The I/O unit 208 may also send output to a display, printer, or other suitable output device. Note, however, that the I/O unit 208 may be omitted if the device 200 does not require local I/O, such as when the device 200 represents a server or other device that can be accessed remotely.

Although FIG. 2 illustrates one example of a device 200 supporting intelligent data processing with a multi-interface frontend and backend, various changes may be made to FIG. 2. For example, computing and communication devices and systems come in a wide variety of configurations, and FIG. 2 does not limit this disclosure to any particular computing or communication device or system.

Figure 3:
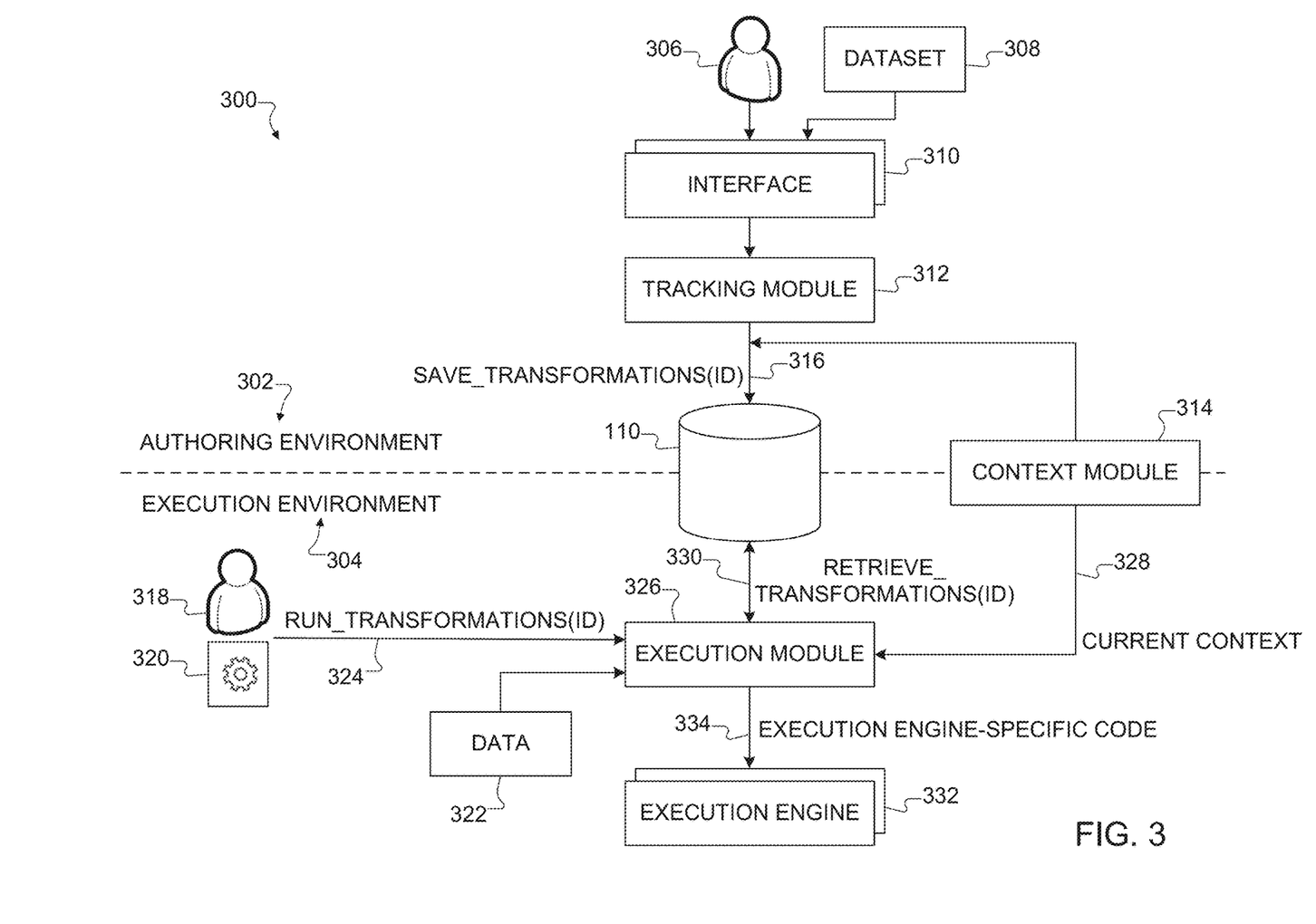
FIG. 3 illustrates an example architecture of an intelligent data processing system with a multi-interface frontend and backend according to this disclosure.

FIG. 3 illustrates an example architecture 300 of an intelligent data processing system with a multi-interface frontend and backend according to this disclosure. For ease of explanation, the architecture 300 shown in FIG. 3 is described as being implemented on or supported by the application server 106 in the system 100 shown in FIG. 1, where the application server 106 may be implemented using one or more instances of the device 200 shown in FIG. 2. However, the architecture 300 shown in FIG. 3 could be used with any other suitable device and in any other suitable system.

As shown in FIG. 3, the architecture 300 is generally divided into functions associated with an authoring environment 302 and functions associated with an execution environment 304. The authoring environment 302 generally includes functions that allow data and data transformations (code) to be defined, where information associated with the data transformations can be stored in the database 110 or other suitable storage location(s). The execution environment 304 generally includes functions that allow the code to be converted (if necessary) and executed in order to perform the data transformations upon request.

In this example embodiment, the authoring environment 302 can be used by one or more users 306 to define at least one set of data transformations to be applied to at least one input dataset 308. For example, the authoring environment 302 may include one or more interfaces 310 representing one or more frontends that are available for use. Each interface 310 can allow at least one user 306 to load a dataset 308 and define operations to be performed on the dataset 308. Note that a single interface 310 or multiple interfaces 310 may be provided in the architecture 300 depending on the implementation. Each interface 310 includes any suitable logic configured to receive data and information defining transformations to be applied to the data, such as an application programming interface (API). Specific example types of interfaces 310 that may be used here could include the Pandas API and the Structured Query Language (SQL) API.

A tracking module 312 is used in conjunction with the interface(s) 310 in order to track each sequence of transformations being applied to each dataset 308 by one or more users 306 using the interface(s) 310. In other words, the tracking module 312 can identify how each user modifies a dataset 308 using an interface 310, and the tracking module 312 can store this information in the database 110. The tracking module 312 may generate information identifying a sequence of transformations and store the information associated with each sequence of transformations in the database 110 in any suitable manner. For instance, in some cases, the tracking module 312 may generate a directed acyclic graph (DAG) that identifies each sequence of transformations applied to a dataset 308.

A context module 314 is also used within the authoring environment 302 to identify information about each context in which a user 306 is performing a sequence of transformations, and this information can also be stored in the database 110 or can be provided to the execution environment 304. Example types of information that may be identified or generated by the context module 314 are described below. In this example, the tracking module 312 and the context module 314 are shown as collectively storing data 316 associated with the sequence of transformations and optionally the context as part of a "save transformations" action. In some cases, the stored data 316 for each sequence of transformations may be associated with a user-defined identifier (ID) or other type of identification. Also, in some cases, the context module 314 may provide the context information to the tracking module 312 for storage in the database 110, the tracking module 312 may provide the sequence of transformations information to the context module 314 for storage in the database 110, or the context module 314 may provide the context information directly to the execution environment 304.

Note that the users 306 here are free to use any supported interface 310 when defining sequences of transformations to be applied to datasets 308. In some embodiments, for example, the authoring environment 302 may include one or more predefined or preinstalled interfaces 310, and the users 306 may be limited to using those specific interfaces 310. In other embodiments, one or more interfaces 310 may be installed in the authoring environment 302 as needed or desired (with or without one or more predefined or preinstalled interfaces 310 being used in the authoring environment 302). In general, the authoring environment 302 may include any suitable numbers and types of interfaces 310, regardless of how or when the interface or interfaces 310 are made available to users 306. Thus, this approach may allow different users 306 to use various interfaces 310 as needed or desired to define the sequences of transformations and other information performed on input datasets 308.

Once one or more sequences of transformations have been defined using at least one interface 310 within the authoring environment 302, each sequence of transformations can be subsequently applied within the execution environment 304. In this example embodiment, the execution environment 304 can be used to execute the sequences of transformations and process the input datasets 308 defined by the users 306 (during the first time each defined sequence of transformations is being executed). One or more users 318 and/or one or more applications 320 may also request that the same sequences of transformations be performed to their input data 322 (during subsequent executions of the sequences of transformations is being executed). The one or more users 318 represent users who wish to apply previously-defined data transformations to the input data 322, and the one or more applications 320 represent logic (executed by one or more computing devices or other devices) that requests application of previously-defined data transformations to the input data 322. Note that the one or more users 318 may or may not be the same as the one or more users 306. In this example, the application of a previously-defined data transformation may be requested using a "run transformations" request 324. In some cases, a previously-defined data transformation can be requested by including the user-defined identifier or other type of identification associated with the previously-defined data transformation in the request 324.

An execution module 326 generally operates to control the executions of the sequences of transformations for the users 306 and their input datasets 308 and the executions of the sequences of transformations for the users 318/applications 320 and their input data 322. For each sequence of transformations to be performed, the execution module 326 can receive information identifying a current context 328 associated with the data to be processed. Each current context 328 is identified using the context module 314. For example, the context module 314 can be used to identify information about the context for each user 306 as described above, and the context module 314 can be used to identify information about the context in which a user 318 or application 320 is requesting performance of a sequence of transformations for each request 324.

The context module 314 may be used to identify any suitable characteristic(s) associated with the context in which data transformations are occurring. For example, the context module 314 may determine values for different contextual dimensions associated with each sequence of data transformations. In some embodiments, examples of different contextual dimensions that may be used by the context module 314 can include any single one or any combination of the following contextual dimensions. An interactivity context dimension can represent the amount or level of user or application interactions during the processing of data in a sequence of transformations. A data size context dimension can approximate the size or amount of data to be processed during a sequence of transformations. A data type context dimension can represent the type of data to be processed during a sequence of transformations, such as real-time, batch, or streaming data. A data shape context dimension can represent whether data to be processed during a sequence of transformations is structured or unstructured and, if unstructured, a specific type of unstructured data to be processed (such as image data, video data, audio data, etc.). A security profile context dimension can represent the level of security that is needed while processing data during a sequence of transformations. A resource availability context dimension can represent the amount or level of processing resources, memory resources, or other resources that might be needed to process data during a sequence of transformations. A personal identifiable information (PII) context dimension can represent whether data to be processed during a sequence of transformations includes personal identifiable information and, if so, how that data needs to be handled. A retention policy context dimension can represent how long data being processed during a sequence of transformations or its results may need to be retained. A computation comprehensiveness context dimension can represent an overall quantity or level of data to be included in computations during a sequence of transformations. Depending on the implementation, a context may be defined along each of one or more of these context dimensions using discrete values or values that are continuous within a given range of values.

For each sequence of transformations to be performed (either for a user 306, a user 318, or an application 320), the execution module 326 can receive information identifying the current context 328 associated with the data to be processed. The execution module 326 can also obtain information about the specific sequence of transformations to be performed from the database 110, such as by retrieving information defining the sequence of transformations associated with the identifier contained in the request 324 or the sequence of transformations that was defined by the user 306. In some cases, for instance, the database 110 can be queried using a "retrieve transformations" request 330, which can be used to obtain information (such as a directed acyclic graph) associated with the sequence of transformations to be performed.

For each sequence of transformations to be performed, the execution module 326 can use at least some of the obtained information to select one of multiple execution engines 332 to be used to perform the sequence of transformations. The execution engines 332 represent different backends that can use different tools or technologies to perform requested sequences of transformations. Any suitable execution engines 332 may be used here to perform data transformations, such as backends that support different types of machine learning or artificial intelligence (ML/AI) algorithms or other data processing algorithms. In some cases, the execution module 326 may select the particular execution engine 332 to be used for each sequence of transformations to be performed based on the current context 328 of the data to be processed. As a particular example, the execution module 326 may use an in-memory data structure or other mechanism that maps different combinations of values of the contextual dimensions to different ones of the execution engines 332. Thus, the execution module 326 can take the values of a current context 328 and select the execution engine 332 that is mapped to those values.

For each sequence of transformations to be performed, the execution module 326 can further generate execution engine-specific code 334 to be executed by the selected execution engine 332. For example, the execution module 326 may traverse the directed acyclic graph associated with the sequence of transformations to be performed and modify the directed acyclic graph in a suitable manner that enables code 334 to be generated for the selected execution engine 332. Example types of modifications that may be performed to a directed acyclic graph can include removing one or more nodes from the directed acyclic graph, replacing one or more nodes in the directed acyclic graph with one or more other nodes, and/or shuffling the position(s) or order(s) of one or more nodes in the directed acyclic graph. Each node in a directed acyclic graph may generally represent a data operation to be performed as part of a sequence of transformations. The specific ways in which nodes of a directed acyclic graph are modified can vary based on a number of factors, such as the specific execution engine 332 on which the code 334 is to be executed, and no modifications may be needed to a directed acyclic graph in some cases. A modified or unmodified directed acyclic graph may be used by a compiler to generate code 334 for the selected execution engine 332. The compiler may also be used to produce execution engine-specific artifacts based on more-generic artifacts received in response to the request 330. In whatever manner the code 334 is generated, the code 334 can be executed by the selected execution engine 332 in order to perform the desired sequence of transformations.

Note that while the generation of the code 334 for the execution engines 332 is described above as being performed during run-time (such as after the users 306, 318 or applications 320 request execution of the sequences of transformations), other approaches may also be used to generate the code 334. For instance, code 334 for each execution engine 332 may be generated after data 316 associated with each sequence of transformations is obtained and stored in the database 110. In some cases, the code 334 for each execution engine 332 may also be stored in the database 110. Once a specific execution engine 332 is identified (such as in response to a specific request 324), the pre-generated code 334 for the appropriate sequence of transformations can be obtained and provided to that specific execution engine 332 for execution (without further compiling). In general, this disclosure is not limited to any particular order of request receipt and code generation.

As can be seen here, this approach allows the authoring environment 302 to be used to define any desired sequences of data transformations, where information defining the sequences of data transformations can be stored in the database 110 or other location(s) for later use. This can be accomplished using any suitable interface(s) 310 in the authoring environment 302. Also, this approach allows the execution environment 304 to be used to execute the sequences of transformations as requested, which is based (at least in part) on the information retrieved from the database 110 or other location(s). Among other things, the execution engine 332 for each sequence of transformations to be performed can be dynamically selected based on the associated context 328.

In this way, the architecture 300 is able to provide various benefits or advantages depending on the implementation. The following are non-limiting examples of various types of benefits or advantages that might be obtained using the architecture 300. For example, the architecture 300 can enable code to be developed once and then reused across different use cases (different contexts). For example, a user 306 may write code for performing a sequence of data transformations using a dataset 308 within the authoring environment 302, where that sequence of transformations is associated with one context and is used to generate code for execution by one execution engine 332. That code can later be translated by the execution module 326 for execution by any number of other execution engines 332, which can be associated with different contexts. The specific execution engine 332 selected for original use for the user 306 and the specific execution engine 332 selected for use with a subsequent request 324 can vary based on the specific contexts 328 associated with those operations. This allows the contexts and therefore the execution engines 332 used to execute the same sequence of transformations to vary based on (among other things) the changing needs of a user 306, 318 or an application 320.

As another example, the architecture 300 can be used to provide flexibility when choosing between system-driven backends and user-driven backends. For example, in some embodiments, the execution module 326 may allow users 306, 318 and/or applications 320 to select the execution engines 332 to be used to process their data. Among other things, this may allow a user 306, 318 or application 320 to select a specific execution engine 332 for use with specific data, which may be useful when the specific execution engine 332 is known to provide good results when performing specific types of data processing tasks. However, the execution module 326 can also dynamically select the execution engine 332 to be used, such as when the user 306, 318 or application 320 does not specifically identify an execution engine 332 or when the user 306, 318 or application 320 specifically requests dynamic selection of the execution engine 332.

As yet another example, the architecture 300 can be used to accelerate the time-to-value for performing data processing tasks. For example, data-intensive workloads may often involve changing backend needs over time, which would ordinarily involve time-consuming changes to an execution engine used for the data-intensive workloads. Using the architecture 300, the complexity of authoring sequences of data transformations can be reduced, and the same sequence of data transformations can be leveraged and used to execute code 334 on any number of execution engines 332 (including an execution engine 332 selected by a user 306, 318/application 320 or dynamically selected by the architecture 300). In some cases, a user 306 is able to use a single interface 310 to define a transformation, and the specific backend that is used to perform the transformation can change depending on the nature of the data processing task being performed (which can vary dynamically). This can significantly decrease the time needed to perform data processing tasks.

As still another example, the architecture 300 can be used to make server-aware and client-aware decisions when selecting execution engines 332 for use. That is, customers (users 306, 318 and/or applications 320) may implement logic using devices that operate as clients or servers depending on their particular installations. As a particular example of this, some installations may support declarative programming, while other installations may support imperative programming. Different execution engines 332 may therefore be customized for different types of customer installations. In some embodiments, the architecture 300 uses self-declarative programming, which can leverage the benefits of both declarative and imperative programming.

Note that the architecture 300 can still achieve a high level of performance when executing code using dynamically-selected execution engines 332. Among other reasons, this is because the architecture 300 can provide users 306, 318 and/or applications 320 with resource efficiencies, time efficiencies, and reliabilities when the architecture 300 chooses (and if necessary switches between) different execution engines 332 that are best suited to the needs of the users 306, 318 and/or applications 320. For example, time efficiencies can be obtained by providing good trade-offs between interactive and non-interactive contexts. In some cases, for instance, this may allow for faster outputs at lower reliability or slower outputs at higher reliability. Moreover, the architecture 300 can be used to perform data transformations on a wide range of data types, including real-time and streaming data, even when minimal resources are available to process the data. In addition, security-related aspects of the contexts for the data processing tasks can be identified and honored within the architecture 300.

Results that are generated via execution of the code 334 by the selected execution engine 332 for each sequence of transformations can be used in any suitable manner. For example, the results generated by each execution engine 332 can be provided via a suitable interface 310 or other mechanism to the user 306, 318 or application 320 that initiated performance of the sequence of transformations. Since both data processing tasks and the data being processed by the data processing tasks can vary widely, the results generated by the execution engines 332 can be used for any suitable purposes.

Note that the functions shown in or described with respect to FIG. 3 can be implemented in an electronic device, such as a computing device, in any suitable manner. For example, in some embodiments, at least some of the functions shown in or described with respect to FIG. 3 can be implemented or supported using one or more software applications or other software instructions that are executed by one or more processing devices of an application server 106, device 200, or other device. In other embodiments, at least some of the functions shown in or described with respect to FIG. 3 can be implemented or supported using dedicated hardware components. In general, the functions shown in or described with respect to FIG. 3 can be performed using any suitable hardware or any suitable combination of hardware and software/firmware instructions.

Although FIG. 3 illustrates one example of an architecture 300 of an intelligent data processing system with a multi-interface frontend and backend, various changes may be made to FIG. 3. For example, functions and components can be added, omitted, combined, further subdivided, replicated, or placed in any other suitable configuration in the architecture 300 according to particular needs. As a particular example, the architecture 300 may include any suitable number of interfaces 310 and any suitable number of execution engines 332.

Figure 4:
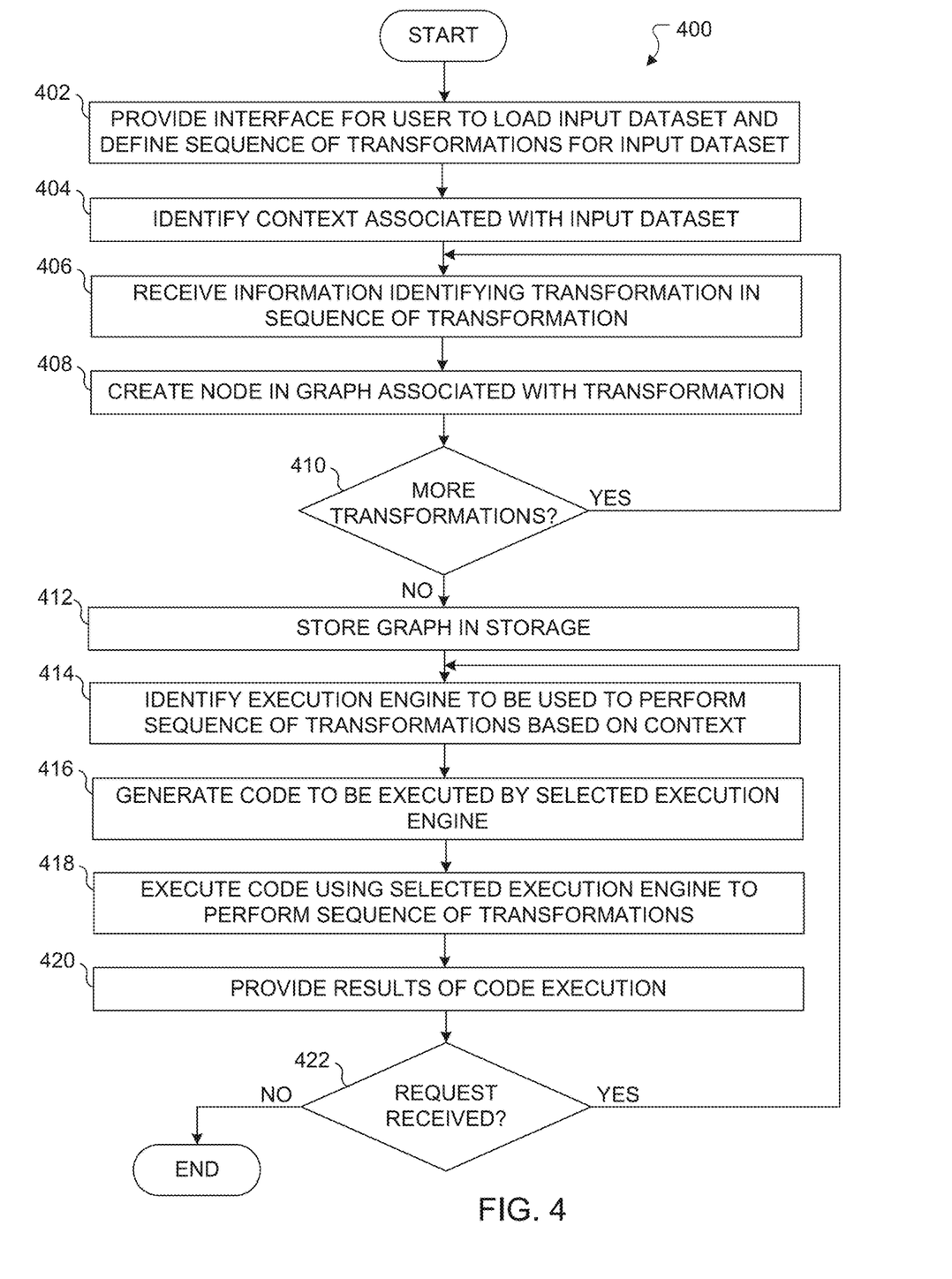
FIG. 4 illustrates an example method for intelligent data processing with a multi-interface frontend and backend according to this disclosure.

FIG. 4 illustrates an example method 400 for intelligent data processing with a multi-interface frontend and backend according to this disclosure. For ease of explanation, the method 400 shown in FIG. 4 is described as being implemented on or supported by the application server 106 in the system 100 shown in FIG. 1, where the application server 106 may be implemented using one or more instances of the device 200 shown in FIG. 2. However, the method 400 shown in FIG. 4 could be performed using any other suitable device and in any other suitable system.

As shown in FIG. 4, an interface is provided for allowing a user to load an input dataset and define a sequence of transformations to be applied to the input dataset at step 402. This may include, for example, the processing device 202 of the application server 106 presenting at least one interface 310 to a user 306. The interface 310 can allow the user 306 to load a dataset 308 and to identify a sequence of transformations to be performed involving the dataset 308. A context associated with the input dataset is identified at step 404. This may include, for example, the processing device 202 of the application server 106 using the context module 314 to determine one or more values of one or more context dimensions.

Information defining a transformation in the sequence of transformations is obtained at step 406 and used to generate a node in a graph at step 408. This may include, for example, the processing device 202 of the application server 106 using the tracking module 312 to obtain information associated with a transformation defined by the user 306 using the interface 310. This may also include the processing device 202 of the application server 106 generating a node in a directed acyclic graph identifying the transformation and optionally signing the node. As long as the user continues defining transformations at step 410, the process can repeat steps 406-408 to collect information about the transformations and generate nodes in the graph. Once a terminal transformation is provided by the user, the completed graph is stored in a storage at step 412. This may include, for example, the processing device 202 of the application server 106 storing the directed acyclic graph in the database 110. The directed acyclic graph may represent a backend-agnostic sequence of transformations, or the directed acyclic graph may be used to generate a backend-agnostic sequence of transformations.

An execution engine to be used to perform the sequence of transformations is identified based on the identified context at step 414. This may include, for example, the processing device 202 of the application server 106 using the execution module 326 to determine how the value(s) of the context dimension(s) associated with the input dataset 308 are mapped to a particular one of the execution engines 332. Code to be executed by the selected execution engine is generated at step 416. This may include, for example, the processing device 202 of the application server 106 using the execution module 326 to modify the directed acyclic graph (if needed) based on the selected execution engine 332. This may also include a compiler compiling the modified or unmodified directed acyclic graph or other information to produce execution engine-specific code 334. The code is executed using the selected execution engine to perform the sequence of transformations on the data at step 418. This may include, for example, the processing device 202 of the application server 106 using the selected execution engine 332 to execute the execution engine-specific code 334 and perform the sequence of transformations on the input dataset 308. The results of the code execution are provided to at least one suitable destination at step 420. This may include, for example, the selected execution engine 332 providing the data processing results to the user 306 via the interface 310.

At this point, it is possible for the same sequence of transformations to be requested by the same user 306, another user 318, or an application 320. As a result, a determination is made whether a request is received for the sequence of transformations at step 422. This may include, for example, the processing device 202 of the application server 106 determining whether a request 324 is received from a user 318 or application 320 identifying the sequence of transformations. In some cases, the request 324 can identify the sequence of transformations to be applied and the data 322 to which the sequence of transformations is to be applied. The process can then perform steps 414-420 again, but this time the current context 328 is determined for the new request 324 and is used to select an appropriate execution engine 332 (which may or may not be the same execution engine 332 used initially for the user 306). Note that steps 414-420 here may be repeated any number of times based on any number of requests 324, and each request 324 can be associated with its own unique context 328.

Although FIG. 4 illustrates one example of a method 400 for intelligent data processing with a multi-interface frontend and backend, various changes may be made to FIG. 4. For example, while shown as a series of steps, various steps in FIG. 4 may overlap, occur in parallel, occur in a different order, or occur any number of times. As a particular example, as noted above, the execution engine-specific code 334 may be generated for one or more of the execution engines 332 prior to receipt of a request 324.

Figure 5:
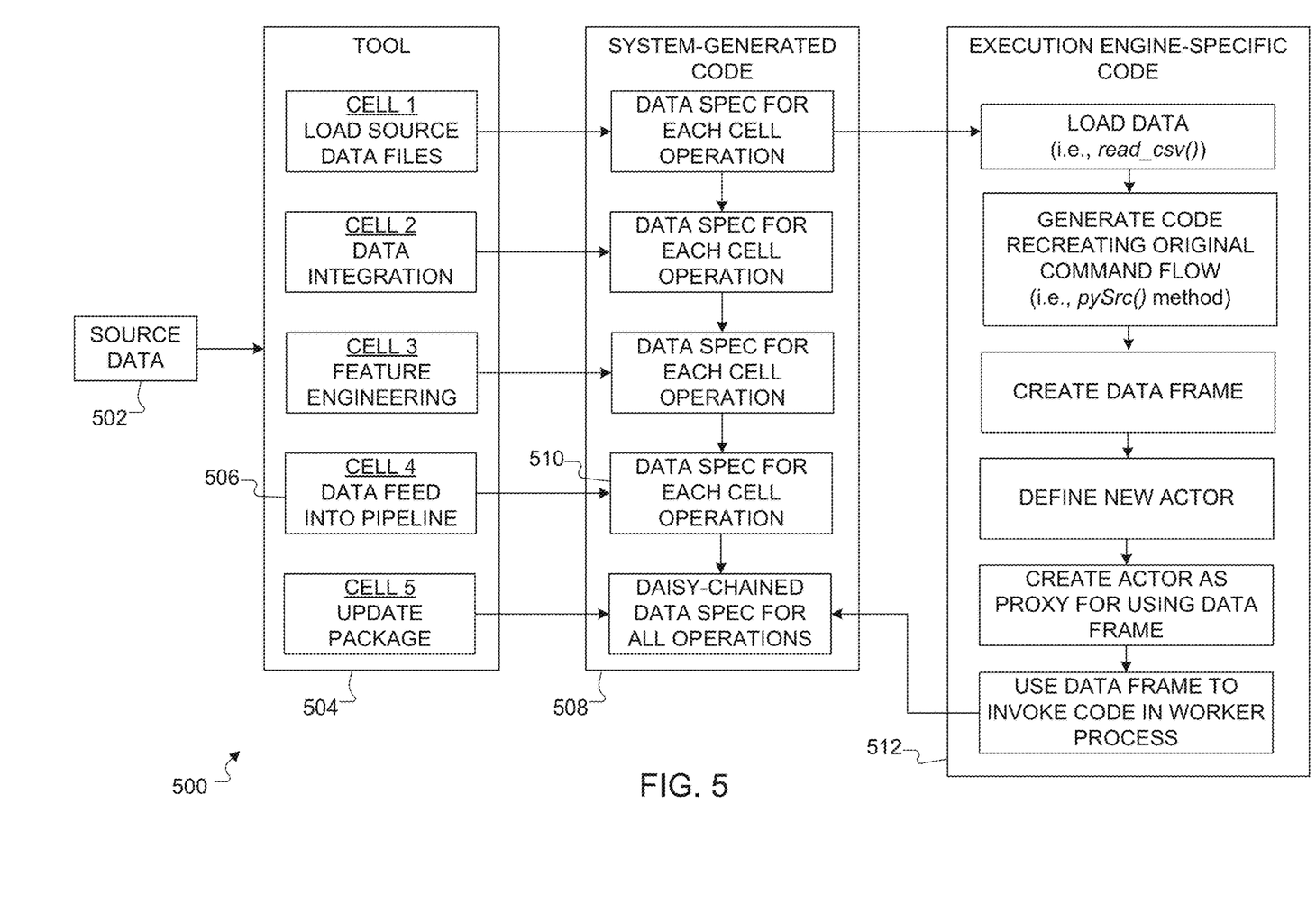
FIG. 5 illustrates an example process for generating execution engine-specific code for execution by a selected backend according to this disclosure.

FIG. 5 illustrates an example process 500 for generating execution engine-specific code for execution by a selected backend according to this disclosure. The process 500 shown in FIG. 5 may, for example, represent the process of collecting user input via an interface 310, where the user input defines a sequence of data transformations to be performed. The process 500 shown in FIG. 5 also illustrates how the tracking module 312 can generate information about the sequence of data transformations and how the execution module 326 can use this information to produce execution engine-specific code 334 suitable for execution by a selected execution engine 332.

As shown in FIG. 5, one or more data sources 502 represent one or more interfaces (such as one or more interfaces 310) that can be used to obtain data from one or more users 306. In some embodiments, each data source 502 may be associated with a different programming language and a different data storage mechanism. Depending on the implementation, there may be a single data source 502 or multiple data sources 502 provided for use here.

Each user 306 can use one or more tools 504 to write code defining sequences of data transformations in one or more specific programming languages. In some embodiments, the tool 504 that is accessed and used by each user 306 can vary depending on which data source 502 is used by the user 306, so different data sources 502 may be associated with different tools 504. In some cases, for instance, a tool 504 may represent a JUPYTER LAB tool that uses the Pandas programming language. Of course, different tools 504 can be provided to support different programming languages if desired.

Each tool 504 here can be used to define a sequence of operations to be performed, where the sequence of operations represents a sequence of data transformations being defined by a user 306. Each operation in the sequence may be represented by a cell 506, and each cell 506 can identify at least one operation defined by the user 306. In this example, the first cell 506 represents a request to load one or more source data files. The second cell 506 represents at least one request to perform one or more data integration operations, which can include any suitable operation(s) to prepare the source data for processing. The third cell 506 represents at least one request related to feature engineering, which can include any suitable operation(s) needed to identify features of the source data that are to be processed further. The fourth cell 506 represents at least one request related to feeding the processed data (such as the identified features) into a machine learning pipeline or other data processing architecture. The fifth cell 506 represents a request to update a package that encapsulates the sequence of operations. Of course, the operations represented by the cells 506 will vary based on the specific sequence of data transformations being defined by a user 306. In some cases, the cells 506 can be digitally signed (such as by using the users' digital keys) in order to associate specific users 306 with specific cells 506 and/or to prevent unauthorized modification of the cells 506.

Each user-defined sequence of operations generated by a user 306 using a tool 504 is converted into system-generated code 508, which (when executed) can be used to perform the user-defined sequence of operations. In some cases, the system-generated code 508 can be defined using a directed acyclic graph, where the directed acyclic graph includes a number of nodes 510. Each node 510 in the directed acyclic graph represents one or more operations to be performed, and each node 510 may correspond to one of the cells 506 generated using the tool 504. For instance, each node 510 may include one or more data specifications ("data specs") that identify the specific operation(s) performed in the corresponding cell 506. The information defined within the nodes 510 can identify the operations corresponding to every line of code generated by the user 306 using the tool 504. Thus, the nodes 510 of the directed acyclic graph may represent the logic needed to implement the user-defined sequence of operations. However, the directed acyclic graph can be generic in that it is not tied to any particular execution engine 332. As can be seen here, the nodes 510 form a directed acyclic graph since the nodes 510 are ordered in a specific sequence, which is defined by the arrows to/from/ between the nodes 510. In some cases, a directed acyclic graph is at least one of the items that the tracking module 312 can generate and store in the database 110 when a user 306 uses an interface 310 to define a sequence of transformations.

After a user 306 issues a terminal transformation (meaning a final transformation defined by the user 306), the directed acyclic graph may be stored in the database 110. Also, a specific execution engine 332 can be selected as described above based on the current context associated with the user 306. In order to execute the sequence of transformations defined by the directed acyclic graph on the selected execution engine 332, the directed acyclic graph can be converted into code 512 that is suitable for execution by the selected execution engine 332. Because the directed acyclic graph generically defines operations to be performed, the directed acyclic graph can be easily converted into code 512 that is specific to the execution engine 332 on which the code 512 is to be executed. The code 512 may then be compiled or otherwise prepared and sent to the selected execution engine 332 for execution. If the same sequence of transformations is requested again (such as via a request 324) but a different execution engine 332 is selected, the directed acyclic graph can again be retrieved and used to generate code 512 for execution by that selected execution engine 332. Note that after code 512 is generated for a specific execution engine 332, the code 512 might be stored (such as in the database 110) so that the code 512 can be executed again later if requested without delay.

Note that the specific operations performed within the code 512 will typically vary depending on (among other things) the execution engine 332 to be used to execute the code 512. Because the directed acyclic graph includes data specs or other information that generically defines the operations to be performed as part of a user-defined sequence of operations, knowledge of a specific execution engine 332 can be used to generate logic that allows the execution module 326 to convert data specs into execution engine-specific code. By defining suitable logic for all available execution engines 332, the execution module 326 is able to convert directed acyclic graphs into suitable code 512 whenever executions of user-defined sequences of operations are requested.

Although FIG. 5 illustrates one example of a process 500 for generating execution engine-specific code for execution by a selected backend, various changes may be made to FIG. 5. For example, the code defined by a user may include any suitable number of operations, and these operations may be converted into any suitable operations to be executed by a selected execution engine 332. Also, the specific code 512 shown in FIG. 5 relates to a specific execution engine 332, and any other suitable code 512 may be generated depending on the execution engine 332.

The following describes example embodiments of this disclosure that implement an intelligent data processing system with a multi-interface frontend and backend. However, other embodiments may be used in accordance with the teachings of this disclosure.

In a first embodiment, a method includes identifying a sequence of transformations to be performed on an input dataset via a user interface. The method also includes identifying a first context associated with the input dataset. The method further includes selecting a first one of multiple execution engines to be used to perform the sequence of transformations on the input dataset based on the first context. In addition, the method includes providing first code implementing the sequence of transformations to the first execution engine and executing the first code using the first execution engine to perform the sequence of transformations on the input dataset.

In a second embodiment, an apparatus includes at least one processing device configured to identify a sequence of transformations to be performed on an input dataset via a user interface. The at least one processing device is also configured to identify a first context associated with the input dataset. The at least one processing device is further configured to select a first one of multiple execution engines to be used to perform the sequence of transformations on the input dataset based on the first context. In addition, the at least one processing device is configured to execute first code implementing the sequence of transformations using the first execution engine in order to perform the sequence of transformations on the input dataset.

In a third embodiment, a non-transitory computer readable medium stores computer readable program code that when executed causes one or more processors to identify a sequence of transformations to be performed on an input dataset via a user interface. The medium also stores computer readable program code that when executed causes the one or more processors to identify a first context associated with the input dataset. The medium further stores computer readable program code that when executed causes the one or more processors to select a first one of multiple execution engines to be used to perform the sequence of transformations on the input dataset based on the first context. In addition, the medium stores computer readable program code that when executed causes the one or more processors to execute first code implementing the sequence of transformations using the first execution engine in order to perform the sequence of transformations on the input dataset.

Any single one or any suitable combination of the following features may be used with the first, second, or third embodiment. The user interface may include one of multiple user interfaces, and each user interface may be configured to allow one or more users to define sequences of transformations to be performed on input datasets. A graph associated with the sequence of transformations may be stored, and the first code may be generated based on the graph. The first context may be based on at least one of: an interactivity context dimension representing an amount or level of user or application interactions during the sequence of transformations; a data size context dimension representing a size or amount of data to be processed during the sequence of transformations; a data type context dimension representing a type of data to be processed during the sequence of transformations; a data shape context dimension representing whether data to be processed during the sequence of transformations is structured or unstructured; a security profile context dimension representing a level of security needed while processing data during the sequence of transformations; a resource availability context dimension representing an amount or level of resources needed to process data during the sequence of transformations; a personal identifiable information (PII) context dimension representing whether data to be processed during the sequence of transformations includes personal identifiable information; a retention policy context dimension representing how long data being processed during the sequence of transformations or its results need to be retained; and a computation comprehensiveness context dimension representing an overall quantity or level of data to be included in computations during the sequence of transformations. A request to perform the sequence of transformations on specified data may be received, a second context associated with the request may be identified (the second context may be different from the first context), a second one of the execution engines to be used to perform the sequence of transformations on the specified data may be selected based on the second context (the second execution engine may be different from the first execution engine), and second code implementing the sequence of transformations may be executed using the second execution engine to perform the sequence of transformations on the specified data. Information identifying the sequence of transformations to be performed on the input dataset may be stored in a data storage along with an identifier, and the request may include the identifier. The sequence of transformations may be identified by identifying multiple transformations to be performed on the input dataset via the user interface and, for each transformation, generating a node in a directed acyclic graph defining the transformation and signing the node.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive (HDD), a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrases "at least one of" and "one or more of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
  identifying a sequence of transformations to be performed on an input dataset via a user interface;
  identifying a first context associated with the input dataset, the first context comprising multiple context dimensions;
  selecting a first one of multiple execution engines to be used to perform the sequence of transformations on the input dataset based on the first context;
  providing first code implementing the sequence of transformations to the first execution engine, the first code comprising a machine learning algorithm; and
  executing the first code including the machine learning algorithm using the first execution engine to perform the sequence of transformations on the input dataset;
  wherein the multiple context dimensions comprise two or more of an interactivity context dimension, a data size context dimension, a data shape context dimension, a security profile context dimension, a resource availability context dimension, a personal identifiable information (PII) context dimension, a retention policy context dimension, and a computation comprehensiveness context dimension; and
  wherein the interactivity context dimension represents an amount or level of user or application interactions during the sequence of transformations.

2. The method of claim 1, wherein:
  the user interface comprises one of multiple user interfaces; and
  each user interface is configured to allow one or more users to define sequences of transformations to be performed on input datasets.

3. The method of claim 1, further comprising:
  storing a graph associated with the sequence of transformations; and
  generating the first code based on the graph.

4. The method of claim 1, wherein:
  the data size context dimension represents a size or amount of data to be processed during the sequence of transformations;
  the data shape context dimension represents whether data to be processed during the sequence of transformations is structured or unstructured;
  the security profile context dimension represents a level of security needed while processing data during the sequence of transformations;
  the resource availability context dimension represents an amount or level of resources needed to process data during the sequence of transformations;

the personal identifiable information (PII) context dimension represents whether data to be processed during the sequence of transformations includes personal identifiable information;

the retention policy context dimension represents how long data being processed during the sequence of transformations or its results need to be retained; and the computation comprehensiveness context dimension represents an overall quantity or level of data to be included in computations during the sequence of transformations.

5. The method of claim 1, further comprising:
receiving a request to perform the sequence of transformations on specified data;
identifying a second context associated with the request, the second context different from the first context;
selecting a second one of the execution engines to be used to perform the sequence of transformations on the specified data based on the second context, the second execution engine different from the first execution engine;
providing second code implementing the sequence of transformations to the second execution engine; and
executing the second code using the second execution engine to perform the sequence of transformations on the specified data.

6. The method of claim 5, further comprising:
storing information identifying the sequence of transformations to be performed on the input dataset in a data storage along with an identifier;
wherein the request includes the identifier.

7. The method of claim 1, wherein identifying the sequence of transformations comprises:
identifying multiple transformations to be performed on the input dataset via the user interface; and
for each transformation, generating a node in a directed acyclic graph defining the transformation and signing the node.

8. An apparatus comprising:
at least one processing device comprising one or more processors, the at least one processing device configured to:
identify a sequence of transformations to be performed on an input dataset via a user interface;
identify a first context associated with the input dataset, the first context comprising multiple context dimensions;
select a first one of multiple execution engines to be used to perform the sequence of transformations on the input dataset based on the first context; and
execute first code implementing the sequence of transformations using the first execution engine in order to perform the sequence of transformations on the input dataset, the first code comprising a machine learning algorithm;
wherein the multiple context dimensions comprise two or more of an interactivity context dimension, a data size context dimension, a data shape context dimension, a security profile context dimension, a resource availability context dimension, a personal identifiable information (PII) context dimension, a retention policy context dimension, and a computation comprehensiveness context dimension; and
wherein the interactivity context dimension represents an amount or level of user or application interactions during the sequence of transformations.

9. The apparatus of claim 8, wherein:
the user interface comprises one of multiple user interfaces; and
each user interface is configured to allow one or more users to define sequences of transformations to be performed on input datasets.

10. The apparatus of claim 8, wherein the at least one processing device is further configured to:
store a graph associated with the sequence of transformations; and
generate the first code based on the graph.

11. The apparatus of claim 8, wherein:
the data size context dimension represents a size or amount of data to be processed during the sequence of transformations;
the data shape context dimension represents whether data to be processed during the sequence of transformations is structured or unstructured;
the security profile context dimension represents a level of security needed while processing data during the sequence of transformations;
the resource availability context dimension represents an amount or level of resources needed to process data during the sequence of transformations;
the personal identifiable information (PII) context dimension represents whether data to be processed during the sequence of transformations includes personal identifiable information;
the retention policy context dimension represents how long data being processed during the sequence of transformations or its results need to be retained; and
the computation comprehensiveness context dimension represents an overall quantity or level of data to be included in computations during the sequence of transformations.

12. The apparatus of claim 8, wherein the at least one processing device is further configured to:
receive a request to perform the sequence of transformations on specified data;
identify a second context associated with the request, the second context different from the first context;
select a second one of the execution engines to be used to perform the sequence of transformations on the specified data based on the second context, the second execution engine different from the first execution engine; and
execute second code implementing the sequence of transformations using the second execution engine in order to perform the sequence of transformations on the specified data.

13. The apparatus of claim 12, wherein:
the at least one processing device is further configured to store information identifying the sequence of transformations to be performed on the input dataset in a data storage along with an identifier; and
the request includes the identifier.

14. The apparatus of claim 8, wherein, to identify the sequence of transformations, the at least one processing device is configured to:
identify multiple transformations to be performed on the input dataset via the user interface; and
for each transformation, generate a node in a directed acyclic graph defining the transformation and signing the node.

15. A non-transitory computer readable medium storing computer readable program code that when executed causes one or more processors to:

identify a sequence of transformations to be performed on an input dataset via a user interface;

identify a first context associated with the input dataset, the first context comprising multiple context dimensions;

select a first one of multiple execution engines to be used to perform the sequence of transformations on the input dataset based on the first context; and execute first code implementing the sequence of transformations using the first execution engine in order to perform the sequence of transformations on the input dataset, the first code comprising a machine learning algorithm;

wherein the multiple context dimensions comprise two or more of an interactivity context dimension, a data size context dimension, a data shape context dimension, a security profile context dimension, a resource availability context dimension, a personal identifiable information (PII) context dimension, a retention policy context dimension, and a computation comprehensiveness context dimension; and wherein the interactivity context dimension represents an amount or level of user or application interactions during the sequence of transformations.

16. The non-transitory computer readable medium of claim 15, wherein:

the user interface comprises one of multiple user interfaces; and each user interface is configured to allow one or more users to define sequences of transformations to be performed on input datasets.

17. The non-transitory computer readable medium of claim 15, further storing computer readable program code that when executed causes the one or more processors to:

store a graph associated with the sequence of transformations; and generate the first code based on the graph.

18. The non-transitory computer readable medium of claim 15, wherein:

the data size context dimension represents a size or amount of data to be processed during the sequence of transformations;

the data shape context dimension represents whether data to be processed during the sequence of transformations is structured or unstructured;

the security profile context dimension represents a level of security needed while processing data during the sequence of transformations;

the resource availability context dimension represents an amount or level of resources needed to process data during the sequence of transformations;

the personal identifiable information (PII) context dimension represents whether data to be processed during the sequence of transformations includes personal identifiable information;

the retention policy context dimension represents how long data being processed during the sequence of transformations or its results need to be retained; and the computation comprehensiveness context dimension represents an overall quantity or level of data to be included in computations during the sequence of transformations.

19. The non-transitory computer readable medium of claim 15, further storing computer readable program code that when executed causes the one or more processors to:

receive a request to perform the sequence of transformations on specified data;

identify a second context associated with the request, the second context different from the first context;

select a second one of the execution engines to be used to perform the sequence of transformations on the specified data based on the second context, the second execution engine different from the first execution engine; and execute second code implementing the sequence of transformations using the second execution engine in order to perform the sequence of transformations on the specified data.

20. The non-transitory computer readable medium of claim 19, further storing computer readable program code that when executed causes the one or more processors to store information identifying the sequence of transformations to be performed on the input dataset in a data storage along with an identifier;

wherein the request includes the identifier.

21. The non-transitory computer readable medium of claim 15, wherein the computer readable program code that when executed causes the one or more processors to identify the sequence of transformations comprises:

computer readable program code that when executed causes the one or more processors to:

identify multiple transformations to be performed on the input dataset via the user interface; and for each transformation, generate a node in a directed acyclic graph defining the transformation and signing the node.

* * * * *